US009206843B2

(12) United States Patent
Hauk et al.

(10) Patent No.: US 9,206,843 B2
(45) Date of Patent: Dec. 8, 2015

(54) METHOD OF PRODUCING BUSHING AND PIECE WITH BUSHING

(71) Applicants: Karel Hauk, Warrenville, IL (US); Mario Pagliuzza, Barrington, IL (US)

(72) Inventors: Karel Hauk, Warrenville, IL (US); Mario Pagliuzza, Barrington, IL (US)

(73) Assignee: Dial Tool Industries, Inc., Addison, IL (US)

( * ) Notice: Subject to any disclaimer, the term of this patent is extended or adjusted under 35 U.S.C. 154(b) by 58 days.

(21) Appl. No.: 14/103,387

(22) Filed: Dec. 11, 2013

(65) Prior Publication Data

US 2014/0099050 A1    Apr. 10, 2014

Related U.S. Application Data

(62) Division of application No. 13/022,192, filed on Feb. 7, 2011, now abandoned.

(60) Provisional application No. 61/303,543, filed on Feb. 11, 2010.

(51) Int. Cl.
*F16C 33/04* (2006.01)
*B21D 53/10* (2006.01)
*F16C 33/14* (2006.01)

(52) U.S. Cl.
CPC .............. *F16C 33/046* (2013.01); *B21D 53/10* (2013.01); *F16C 33/14* (2013.01); *Y10T 83/0524* (2015.04)

(58) Field of Classification Search
CPC ........ B21D 28/06; B21D 28/10; B21D 53/10; B21D 43/05; F16C 33/14; F16C 33/046; Y10T 83/0524; Y10T 83/0586

USPC .............................................. 72/404, 405.01
See application file for complete search history.

(56) References Cited

U.S. PATENT DOCUMENTS

| | | | |
|---|---|---|---|
| 578,800 A | 3/1897 | Wilmot | |
| 578,801 A | 3/1897 | Wilmot | |
| 1,213,684 A | 1/1917 | Osterholm | |
| 1,613,039 A | 1/1927 | McLaren | |
| 1,999,818 A | 4/1935 | McIntyre | |
| 2,177,584 A | 10/1939 | Salansky | |
| 2,283,918 A | 5/1942 | Dekome | |
| 2,624,645 A | 1/1953 | Virtue | |
| 2,855,252 A | 9/1954 | Budinger et al. | |
| 2,739,018 A | 3/1956 | Collett | |
| 2,762,117 A | 9/1956 | Houck | |
| 2,762,118 A | 9/1956 | Shaw et al. | |
| 3,050,649 A | 8/1958 | Thomasko | |
| 4,240,682 A | 12/1980 | Benson | |
| 4,356,719 A * | 11/1982 | Sutherland et al. | 72/379.2 |
| 4,466,689 A * | 8/1984 | Davis et al. | 439/801 |
| 4,538,647 A | 9/1985 | Saurenman et al. | |
| 5,013,491 A | 5/1991 | Nutter | |
| 5,862,579 A * | 1/1999 | Blumberg | 29/417 |
| 6,079,922 A * | 6/2000 | Ross et al. | 411/180 |
| 6,202,465 B1 * | 3/2001 | Jankoski et al. | 72/368 |

(Continued)

*Primary Examiner* — Edward Tolan
(74) *Attorney, Agent, or Firm* — Vedder Price P.C.

(57) ABSTRACT

This disclosure relates to bushings produced with adapted dovetails for production on a carrying web of a progressive stamping machine at a plurality of stations. The bushing includes a regular shape male dovetail inserted into an irregular shape crenellated female opening at the conclusion of a plurality of operations at stations on a progressive stamping machine. Once the bushing is bent in shape, in a subsequent step, the regular shape male dovetail is punched to lock in place into the irregular shape crenellated female opening.

10 Claims, 7 Drawing Sheets

(56) References Cited

U.S. PATENT DOCUMENTS

| | | | |
|---|---|---|---|
| 6,634,076 B2 | 10/2003 | Hjertman et al. | |
| 7,168,151 B2 | 1/2007 | Niimi et al. | |
| 8,438,896 B2 * | 5/2013 | Kitagawa et al. | 72/404 |
| 2006/0086171 A1 * | 4/2006 | Badour | 72/404 |

* cited by examiner

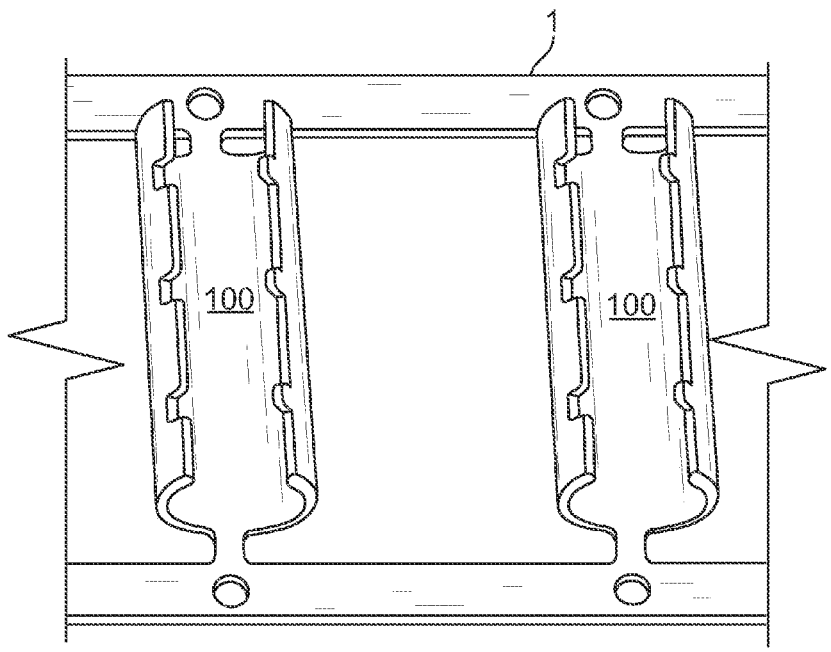
FIG. 7G
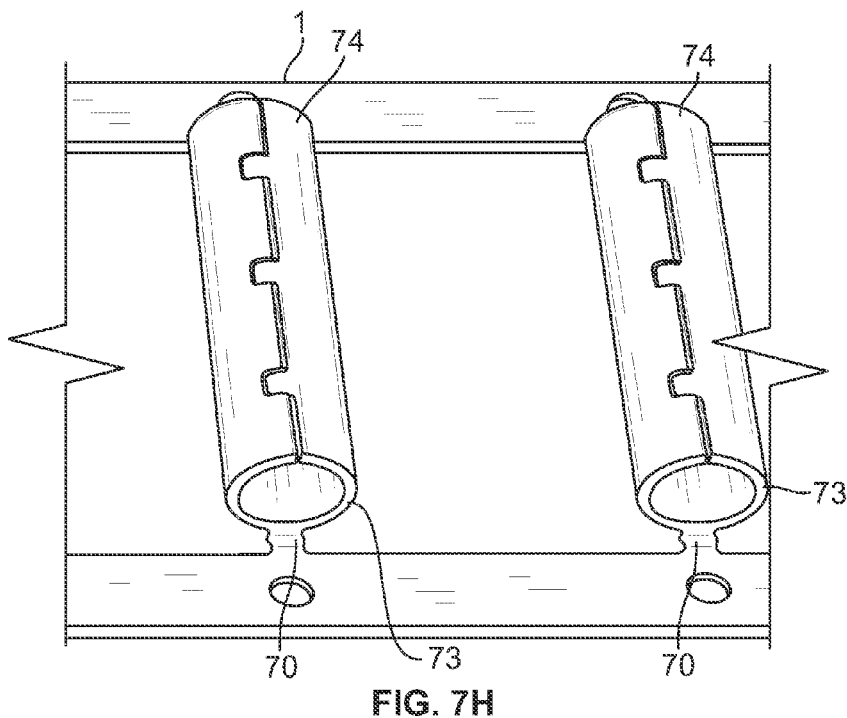
FIG. 7H
FIG. 7I

METHOD OF PRODUCING BUSHING AND PIECE WITH BUSHING

CROSS-REFERENCE TO RELATED APPLICATIONS

This application is a divisional application claiming priority to U.S. application Ser. No. 13/022,192, filed Feb. 7, 2011, which is a non-provisional claiming priority from U.S. Provisional Application No. 61/303,543 filed on Feb. 11, 2010. These prior applications are hereby incorporated herein by reference.

FIELD OF THE DISCLOSURE

This disclosure relates to a bushing, a piece equipped with said bushing, or a method of producing either the bushing or the piece equipped therewith, and more specifically, to a bushing where the bushing is made using a progressive die stamping technology with a dovetail interface.

BACKGROUND OF THE INVENTION

Bushings are often thin sleeves made of a strong material inserted into a housing to provide a rotating element some support or to reinforce a piece having insufficient mechanical properties. For example, in a piece made of plastic, subject to abrasion or corrosion, a non abrasive or non corrosive metal bushing may be slid into a hole into the piece of plastic to provide local reinforced material properties. FIG. 8 shows for example such a piece 200 where a bushing 100 is inserted in an opening 201 for providing local reinforcement.

Bushing are defined and purchased generally based on their internal diameters (ID), their external or outer diameters (OD), their length (L) and their material. The SAE numbering system for bushings as a sleeve is in the format of –XXYY-ZZ, where XX is ID in sixteenths of an inch, YY is the OD also in sixteenth of an inch, and ZZ is the length in eights of an inch.

There are different types of bushings, including a solid sleeve bushing, split bushings, cut bushings, flanged bushing, clenched bushing, etc. While the technology shown in the figures of this disclosure shown the new technology on a clenched bushing, one of ordinary skill in the art will understand that the concepts shown and disclosed herein, if possible could be used for any type of sleeve, bushing, or bearing when applicable. Further, this technology equally applies to two or three piece bushings.

In one piece of art, a yoke can be manufactured as a cylinder made from a flat piece of metal rolled in form. Each end of the sheet can include dovetails created using a punch. In the art, what is known is the use of convexities as dovetails (S-shaped) where the tip of the dovetail is wider than the neck of the dovetail to which the tip is inserted. Wider tips allow for the dovetails to remain mated in place even if the structure tries to open. One clear disadvantage is that the dovetails of adjacent surfaces cannot slide into each other on a plane. In the case of a large yoke, the dovetails are bent into shape along with the body of the yoke. What is then known is how specific portions of the border portions of each dovetails are punched and widened locally once the large tip of the dovetails has been slid pass the neck of the dovetails.

In the art of the production of bushings, what are needed is the manufacture of bushings, pieces with bushings, and methods of producing bushings using greater simplicity in execution, where less industrial operations are needed. Further, the method must allow for the creation of varied types and size of bushings using a very modular technology.

One way to work metal where operations to the metal such as punching, coining, bending are needed is the progressive stamping method. In this technology, a flat strip of raw metal is fed using an automatic system through stations where at each station, one or more operations are performed until a finished product is made. At the final station of the technology, generally a cutoff operation separates the finished part from the carrying web. While the progressive stamping method is quick and easy to use, it requires dies and tooling and may not be adapted to the creation of curved or rounded items as each station is done on a plane. What is needed is a method of using this technology to created efficiently and cheaply bushings from a carrying web.

SUMMARY

This disclosure relates to bushings produced with adapted dovetails for production on a carrying web of a progressive stamping machine at a plurality of stations. The bushing includes a regular shape male dovetail inserted into an irregular shape crenellated female opening at the conclusion of a plurality of operations at stations on a progressive stamping machine. Once the bushing is bent in shape, in a subsequent step, the regular shape male dovetail is punched to lock in place into the irregular shape crenellated female opening.

DESCRIPTION OF THE DRAWINGS

Certain embodiments are shown in the drawings. However, it is understood that the present disclosure is not limited to the arrangements and instrumentality shown in the attached drawings, wherein:

FIGS. 7D-7G are views of the carrying web of FIG. 7C at subsequent stations of the progressive die stamping method where a portion of the carrying web between two adjacent mating openings is curved upwards as part of the process illustrated in part in FIGS. 7A to 7D.

FIG. 7H is a view of the carrying web of FIG. 7G where the regular shaped dovetails are mated with the irregular shaped openings to form a bushing.

FIG. 7I is a view of the bushing cut from the carrying web as shown at FIG. 7H.

DETAILED DESCRIPTION OF THE INVENTION

Figure 1:
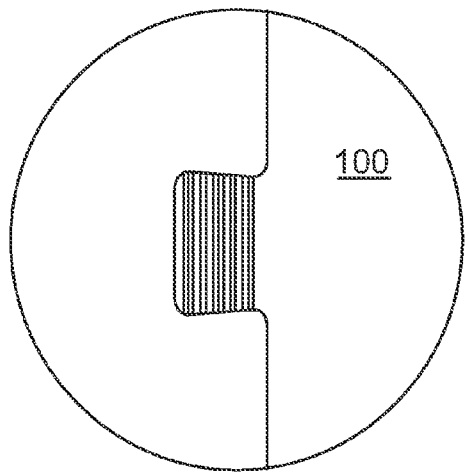
FIG. 1 is a view of the regular shape dovetail mating to an irregular shape opening as shown at FIG. 7G according to an embodiment of the present disclosure.

For the purposes of promoting and understanding the invention and principles disclosed herein, reference is now made to the preferred embodiments illustrated in the drawings, and specific language is used to describe the same. It is nevertheless understood that no limitation of the scope of the invention is thereby intended. Such alterations and further modifications in the illustrated devices and such further applications of the principles disclosed as illustrated herein are contemplated as would normally occur to one skilled in the art to which this disclosure relates.

Progressive die stamping is a metal working method where a long strip of metal also described as a carrying web 1 illustrated at 7A is slid and guided over a series of stations or steps where different operations are performed on a portion of the carrying web. In one embodiment the carrying web 1 is made of a C1050 heat treated to RC 43-48 Zinc per GMW3044 6U48/0 0.00025" Clear Chromate fed into a machine from its end. Further, alignment guides in the shape of small lateral holes 2 are used to help the system move precisely the carrying web through the operations as illustrated at FIGS. 7A to 7I to produce a bushing 100. While the alignment guides shown are in the shape of holes 2, what is also contemplated is the use of any technology for the guidance of the carrying web 1 including but not limited to notches, tabs, friction strips, or electromagnetic controls.

Figure 6:
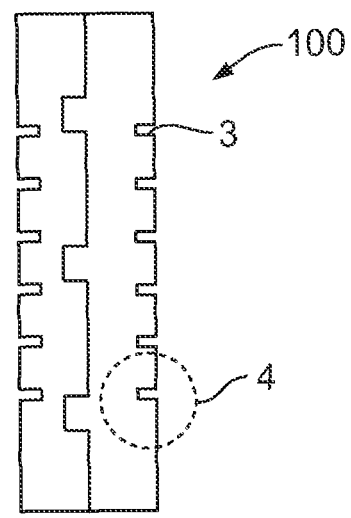
FIG. 6 is an elevation of the bushing made from a progressive die stamping according to an embodiment of the present disclosure.

While one type of metal is described different types of metals, with different surface and heat treatment are also contemplated. In one embodiment, the strip 1 is rectangular in shape and more than 33 mm in width 75 and 1 mm in thickness 76 to produce a bushing 100 as shown on FIG. 6. While one set of possible size and dimension are shown as one contemplated embodiment, one of ordinary skill in the art will recognize that the different thickness and size of bushing 100 is possible and is in relation with the size of the strip of metal 1 to be used in the progressive stamping process. For example, for bushings of a width of 50 mm, a strip of a width 75 of 65 mm can be used.

A metal die is used as a progressive die (not shown) to perform the different steps of operation on the strip of metal or a carrying web 1 to transform progressively a long flat strip of metal also described as a carrying web 1 into bushings 100 and waste metal. As shown at FIG. 7A to 7I, once the bushings 100 at FIG. 7I are cut from the strip by cutting the tabs 70 using a cutting tool from the configuration shown as FIG. 7H, the ends of the bushing 73, 74 can be polished, filed if the ends are to be free of cutting reject and to remove any portion of the tabs 70 residual at either ends 73, 74 of the bushings.

Figure 7A:
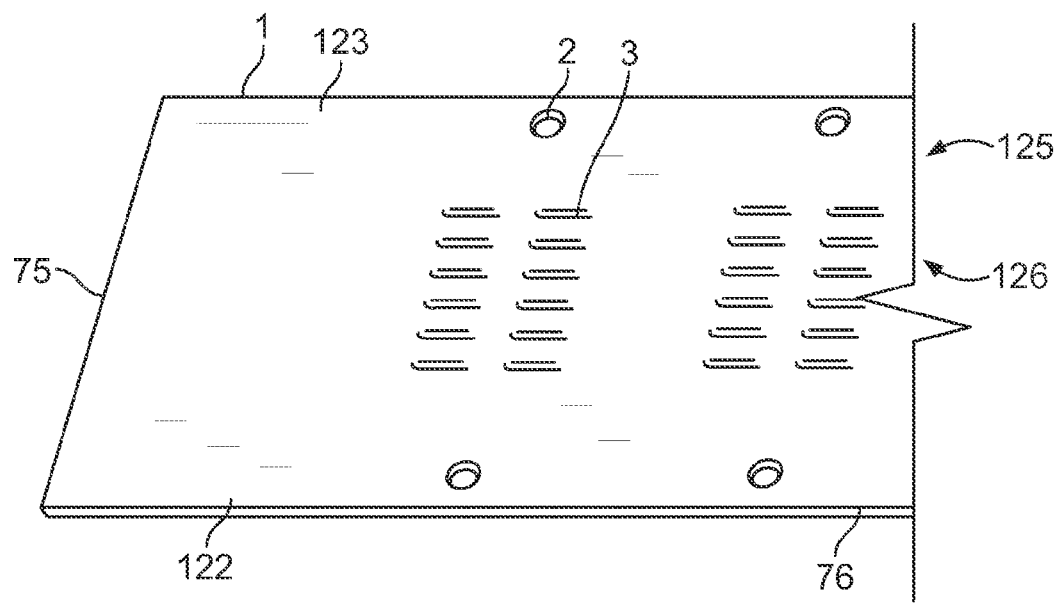
FIG. 7A is a view of the carrying web at a first section of the progressive die stamping method with alignment guides and embosses as part of a process illustrated in part by FIGS. 7A to 7I as one possible embodiment of the present disclosure.

In one embodiment, small lateral holes 2 of circular shape are used a guiding holes by the progressive stamping die (not shown) to guide the strip along the passage inside of a die into the different subsequent steps of the process shown by FIGS. 7A, 7B, 7C, 7D, 7E, 7F, 7G, and 7H respectively. Punch holes 2 are placed as shown at FIG. 7A are regular intervals and are used to help position the strip at subsequent steps in the process. Before the punching, coining, bending, or other way to modify the carrying web 1, a series of pins are lifted into the holes 2 to secure the carrying web 1 at a precise location in the die (not shown) to improve the efficiency of the process. In one embodiment as shown, small lateral holes 2 are punched on both lateral sides of the carrying web 1 at an interval equal to the distance between two bushings before they are formed. In an embodiment, the holes 2 are also punched next to the tabs 70 but could be placed at any location along the carrying web 1 and where the tabs 70 are aligned with the holes 2. The carrying web 1 includes long endless lateral edges 122, 123, and two sides such as an upper side 125 and a lower side 126 where the upper side as shown at FIGS. 7A to 7I will form the inside of the bushing 100 and the lower side 126 will form the external side of the bushing 100.

Figure 4:
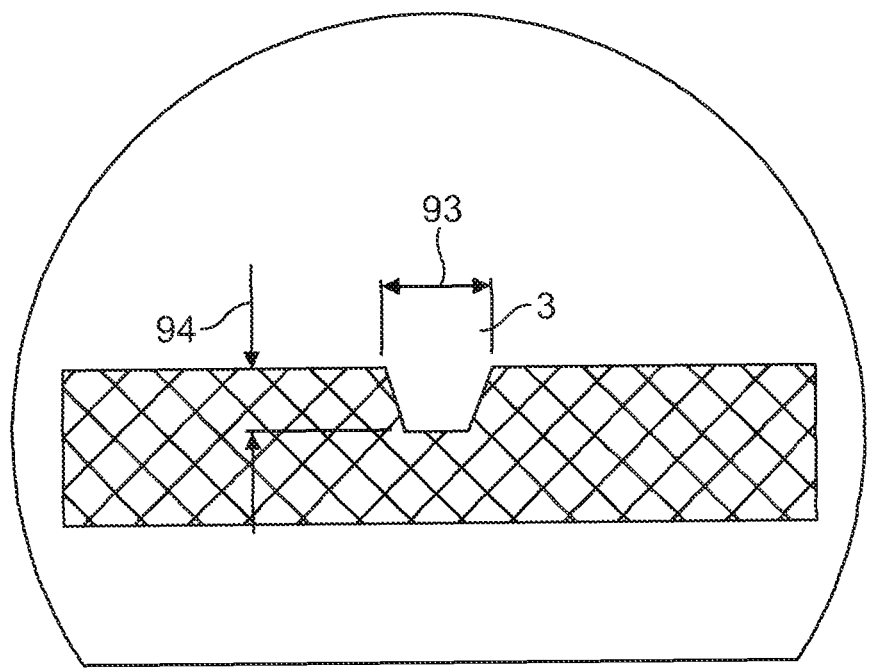
FIG. 4 is a detail view of an emboss punched on the outer shell of the bushing of FIG. 6.
Figure 5:
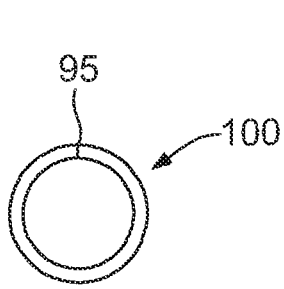
FIG. 5 is a top view of the bushing of FIG. 6.

In the embodiment as shown, a double length die is used where each step of the process and each station has a die to perform operations on two successive portions of the carrying web 1 and ultimately to produce two bushings 100 at once. While a die for two successive bushings 100 is shown, what is contemplated are dies for stations for any number of bushings 100. For example, in a first step as shown at FIG. 7A, six emboss stripes 3 are punched into the metal at two consecutive positions on the carrying web 1. As shown with greater detail at FIG. 4, the emboss 3 is in the shape of a flattened U having a width 93 of 0.7 mm, and a thickness 94 of 0.38 mm. The emboss of 0.38 mm is made in a 1 mm thick metal carrying web 1 to conserve more than half of the thickness of the bushing 100. Each emboss 3 is cup shape over 160 degrees of the external radius of the bushing 100 to allow for the emboss 3 to cover the greatest radial length without interfering with the closing interface 95 of the bushing 100 as shown at FIG. 5.

Figure 8:
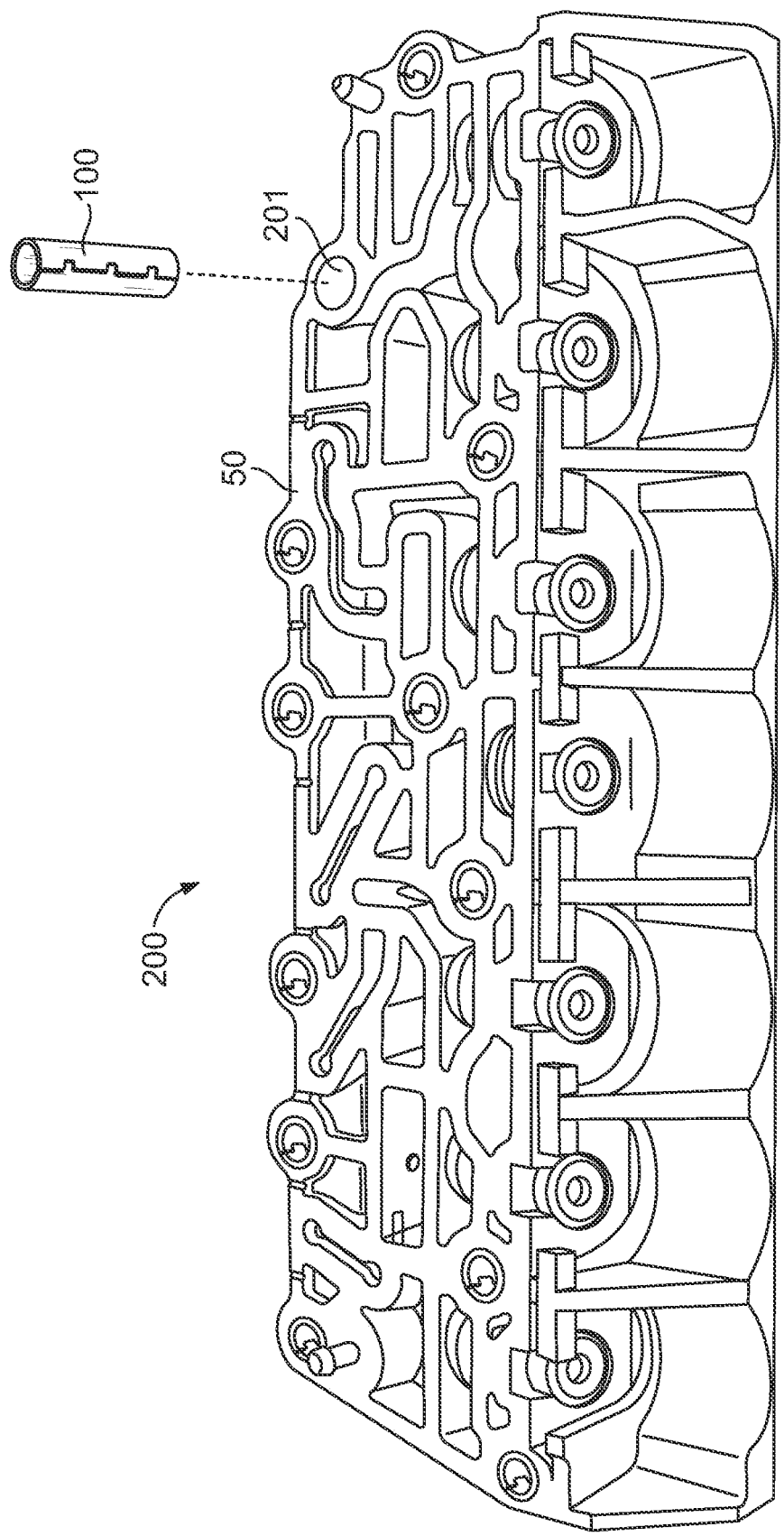
FIG. 8 is a perspective illustration of a piece with a series of bushings placed inside molded piece according to an embodiment of the present disclosure.

These emboss 3 help create zones where ductile material such as plastic as shown at FIG. 8 of a piece 200 can be expanded into the emboss 3 after the bushing 100 is slid by force into an opening 201 of a molding 50 piece 200. One of ordinary skill in the art will recognize that other types of structures, highlights, and embosses either longitudinal, lateral, or radial can be made to the outside surface of the bushing 100 to help hold the bushing 100 into the opening 201. In other contemplated embodiments, the opening 201 may include tabs, edges, or other areas to help support the bushing 100 inside the opening 201. Other equivalent means include small bumps extruded outwardly from the surface of the bushing 100, small dots punched inwards, or even the creation of a friction area such as the use of a chemical treatment to create a rugged area, etc.

Normal progressive stamping tools include a feeding system where a carrying web 1 is pushed and unrolls from a coiled strip through all of the stations of a progressive stamping die. Each station performs one of a series of operations until the bushing 100 is made. The final operation is a cut-off operation, which separates the bushing 100 from the sheet.

Figure 7B:
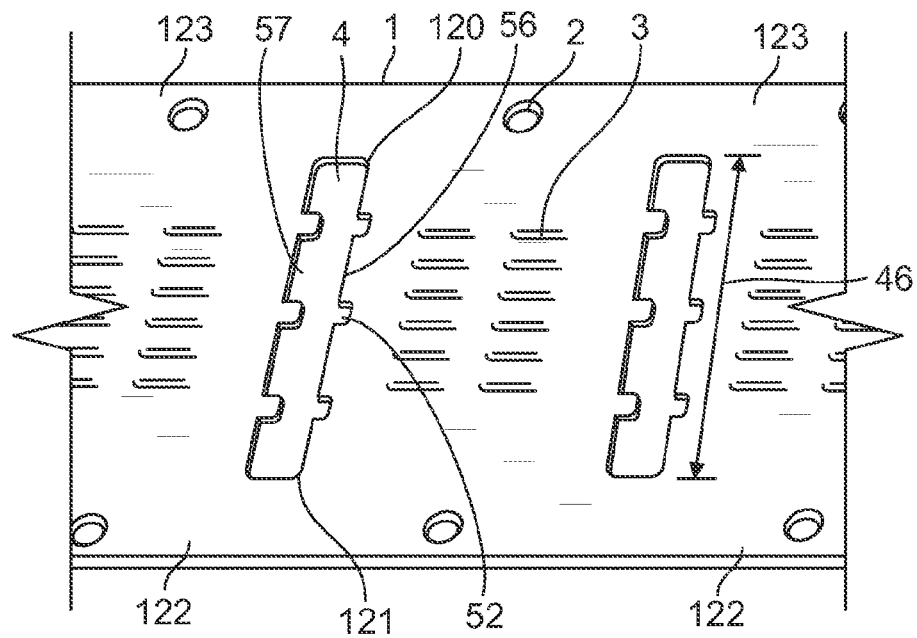
FIG. 7B is a view of the carrying web of FIG. 7A at a second station of the progressive die stamping method with mating openings as part of the process illustrated in part in FIGS. 7A to 7I.

After the creation of the emboss 3, a mating opening 4 is punched at FIG. 7B as shown on two consecutive locations on the carrying web 1. In one embodiment, this width 46 of the mating opening 4 is wider than the size of the bushing 100 to be produced but is smaller than the width 75 of the carrying web 1. The opening 4 includes a top end 120 and a bottom end 121 adjacent to both lateral edges 122, 123 of the carrying web 1.

The mating opening 4 has a forward side (i.e. a side away from the supply of the carrying web 1 into the progressive die stamp) and a backward side (opposite to the forward side). The backward side as shown at FIG. 7 can include a front end 56 (of the bushing 100) with at least a regular shaped dovetail 51 shown as a rectangular shape or a crenellated surface on the front end 56. The mating opening 4 includes a back end 57 with mating irregular shaped openings 52 as shown on FIG. 3 and where both the front end 56 and the back end 57 are located between the top 120 and bottom ends 121 on both sides of the mating opening 4.

Figure 2:
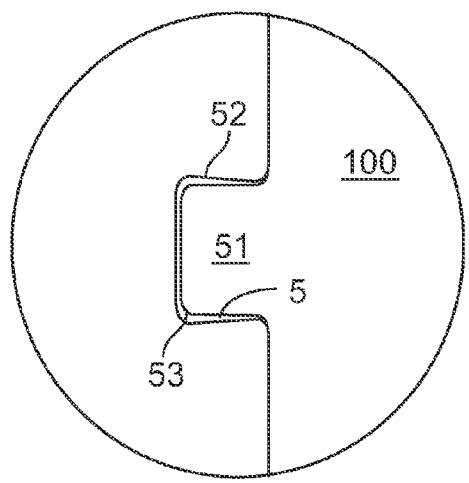
FIG. 2 is a view of the regular shape dovetail mated in the irregular shape opening as shown at FIG. 7H.
Figure 3:
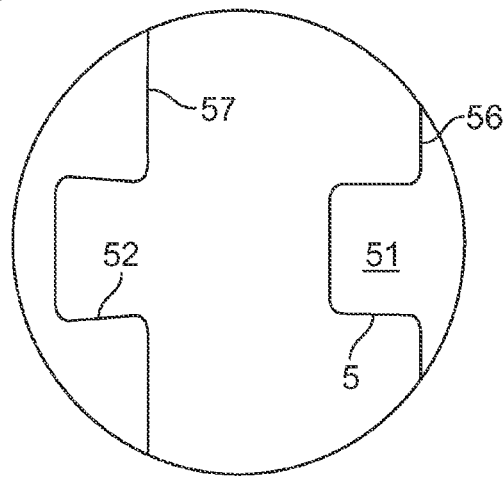
FIG. 3 is a view of the punched area of the dovetail into the irregular shape opening to lock in place the bushing as shown at FIG. 6.

The dovetail 51 is then mated after several curving steps as shown by FIG. 7D to FIG. 7H in the process to the irregular shape crenellated opening 52 also shown at FIG. 3. FIG. 2 illustrates how, the dovetail 51 can be mated with the larger opening 52 to create space 53. In one embodiment, as shown at FIG. 1, the dovetail 51 is punched in a subsequent step to reduce the thickness of the material of the dovetail and expand the dovetail 51 against the opening 52 to close the space 53. As a result of the punching process, the dovetail 51 is flattened and is of smaller thickness than the rest of the bushing 100. This is a relevant feature and allows for the ductile material of the piece 200 to occupy this space to offer a greater friction between the bushing 100 and the piece 200 once the bushing is in place.

Figure 7C:
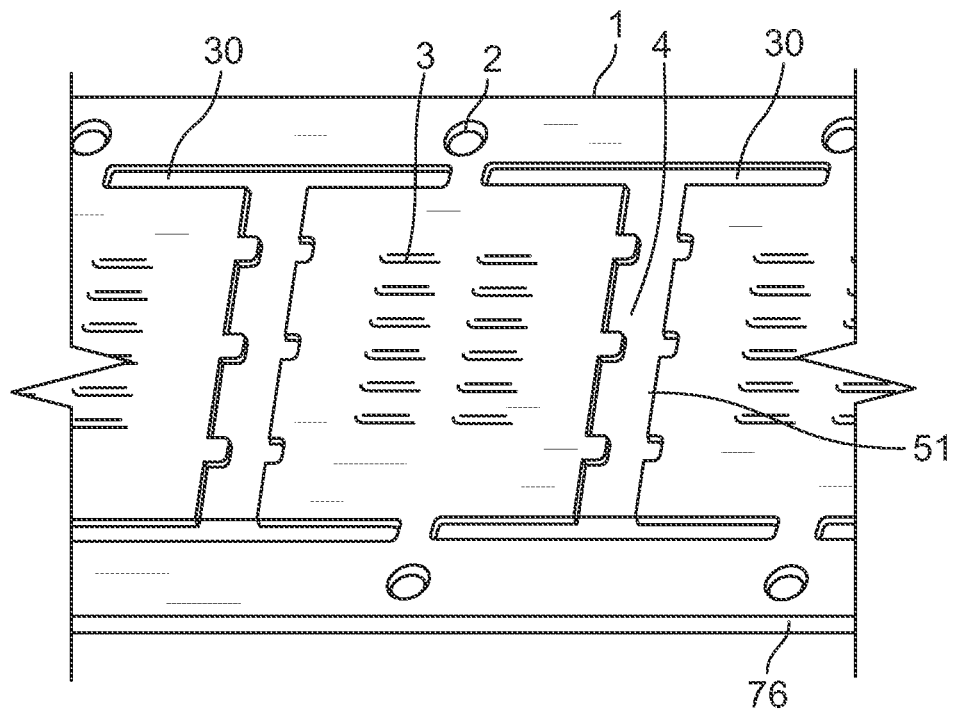
FIG. 7C is a view of the carrying web of FIG. 7B at a third station of the progressive die stamping method with longitudinal slits across the top and bottom ends of the mating openings as part of the process illustrated in part in FIGS. 7A to 7I.
Figure 7D:
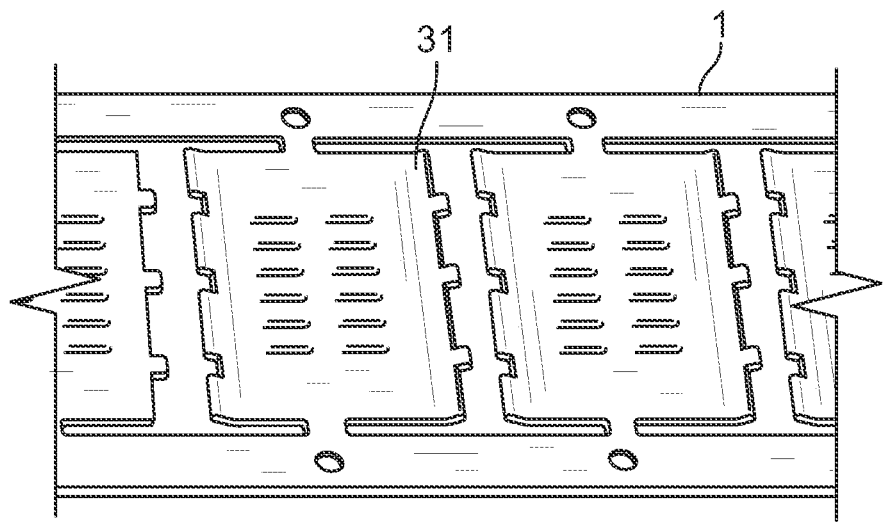
Figure 7E:
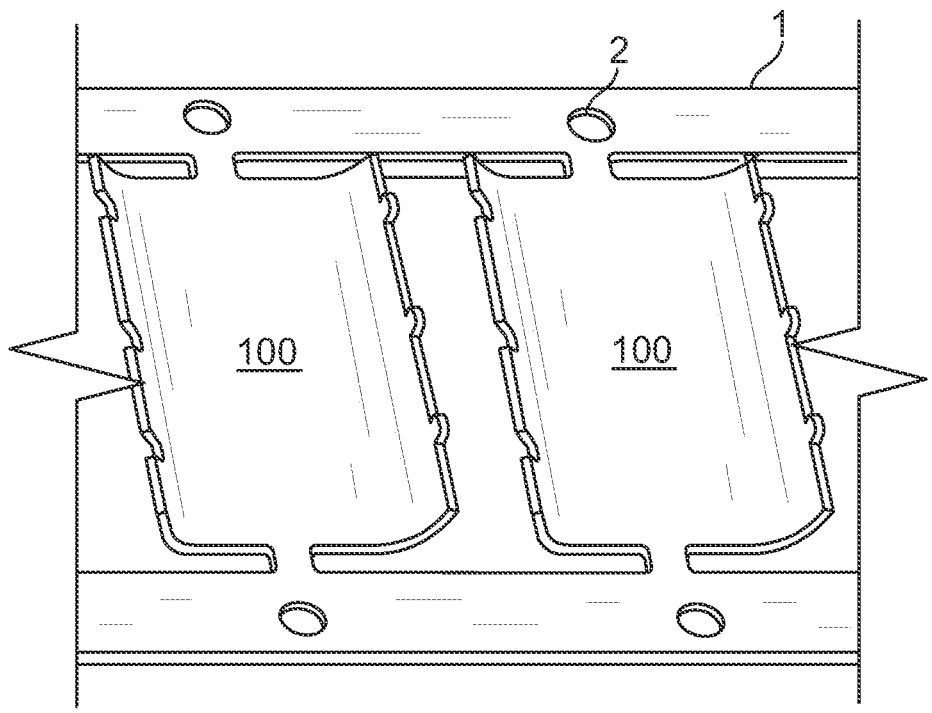
Figure 7F:
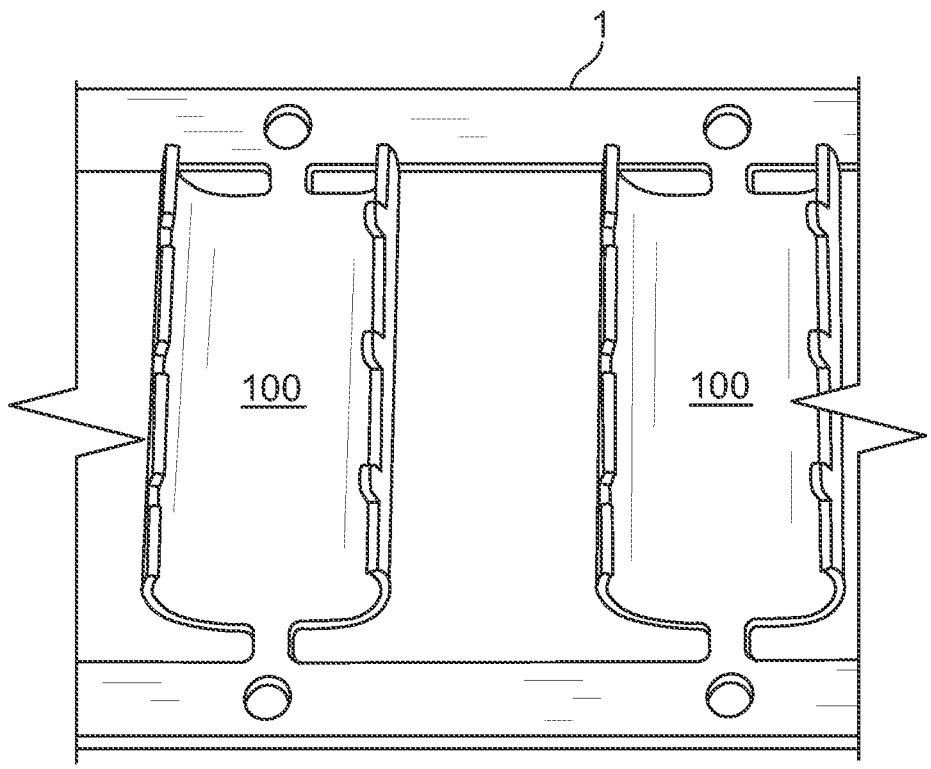

Top longitudinal slits 30 are then punched as shown at FIG. 7C to form the body of the bushing 100 in a flat configuration held in place by tabs 70 to be cut at a subsequent step. The longitudinal slits 30 across the top and bottom ends 120, 121 of the mating openings 4 allow for the back end 57 and the front end 56 to be curved away from the carrying web 1 at a subsequent step.

The external edges 31 are bent at an angle of approximately along a rounded shape. In one embodiment while the body is bent along an arc, the dovetails 51 remain flat and are not bent. Progressively, at steps shown as FIGS. 7D to 7H, a larger portion of the flat portion 40 is bent to form the bushing 100. The bushing 100 is curved as part of the carrying web 1 between two adjacent mating openings 4 along the carrying web 1 to form a bushing 100 in at least two successive steps until the regular shaped dovetail 51 created in a first mating opening 85 mates with the irregular shaped openings 52 of the back end of a second mating opening 86 to for the bushing 100.

Finally, what is now shown at FIG. 7H, is how the bushings 100 are held by two tabs 70 and cut from the carrying web 1. The tabs 70 are cut along both lateral edges 122, 123 between two successive longitudinal slits 30 to remove the bushing 100 from the carrying web 1. The resulting bushing 100 can be slid into an opening of a piece as shown at FIG. 8 where it is forced shut or fixed in place using any known technology. In an alternate embodiment, as a final step of the method as shown at FIG. 7, a press is used where bushings are slid into a circular opening and a rounded peg is used to serve to hold as a punch is applied to the external surface of the dovetail 51 to close the opening 52 as shown at FIG. 1.

What is shown is a method for producing bushings 100 using a progressive die stamping technology, the method comprising the steps of punching alignment guides 2 on both lateral edges 122, 123 of a carrying web 1 having an external side as shown at FIG. 7A, punching a mating opening 4 with top 120, and bottom ends 121 adjacent to both lateral edges 122, 123, and a front end 56 with at least a regular shaped dovetail 51 and a back end 57 with a mating irregular shaped opening 52, the front end 56 and the back end 57 between the top and bottom ends 120, 121 on both sides of the mating opening 4 as shown at FIG. 7B. Further, punching a longitudinal slit 30 across the top and bottom ends 120, 121 of the mating opening 4 to allow for the back end 57 and the front end 56 to be curved away from the carrying web 1 at a subsequent step as shown at FIG. 7C. And curving the carrying web 1 between two adjacent mating openings 4 along the carrying web 1 to form a bushing 100 in at least two successive steps until the regular shaped dovetail 51 created in a first mating opening 85 mates with the irregular shaped openings 52 of the back end 57 of a second mating opening 86 to form the bushing 100 as shown at FIGS. 7D to 7H, and cutting tabs 70 along both lateral edges 122, 123 between two successive longitudinal slits 30 to remove the bushing 100 from the carrying web 1 as shown at FIG. 7I.

A bushing 100 produced in a progressive die stamping technology, the bushing 100 comprising a circular body having a top edge 120 and a bottom edge 121 and a locking interface 95, wherein the locking interface 95 includes a front end 56 with at least a regular shaped dovetail 51 and a back end 57 with a mating irregular shaped opening 52, the front end 56 and the back end 57 between the top and bottom edges 120, 121, wherein the regular shaped dovetail 51 is mated in the irregular shaped opening 52, and wherein the regular shaped dovetail 51 is punched and deformed to lock in the mating irregular shaped opening 52 as shown at FIG. 1. Finally, what is disclosed is a piece 200 as shown at FIG. 8 with at least a bushing 100 produced as described above.

Persons of ordinary skill in the art appreciate that although the teachings of this disclosure have been illustrated in connection with certain embodiments and methods, there is no intent to limit the invention to such embodiments and methods. On the contrary, the intention of this disclosure is to cover all modifications and embodiments falling fairly within the scope the teachings of the disclosure.

What is claimed is:

1. A method for producing bushings using the progressive die stamping technology, the method comprising the steps of:
   (a) using a long strip of metal guided over a series of stations where different steps are performed and first punching alignment guides on both lateral edges of a carrying web having an external side to carry the strip through the operations;
   (b) punching a mating opening with top and bottom ends adjacent to both lateral edges, and a front end with at least a regular shaped dovetail and a back end with a mating irregular shaped opening, the front end and the back end between the top and bottom ends on both sides of the mating opening;
   (c) punching a longitudinal slit across the top and bottom ends of the mating opening to allow for the back end and the front end to be curved away from the carrying web at a subsequent step;
   (d) curving the carrying web between two adjacent mating openings along the carrying web to form a bushing in at least two successive steps until the regular shaped dovetail created in a first mating opening mates with the irregular shaped openings of the back end of a second mating opening to form the bushing; and
   (e) cutting tabs along both lateral edges between two successive longitudinal slits to remove the bushing from the carrying web.

2. The method of claim 1, further including the step of punching the regular shaped dovetail in the irregular shaped openings to lock the dovetail to the opening before the step of cutting tabs.

3. The method of claim 1, further including the step of punching the regular shaped dovetail in the irregular shaped openings to lock the dovetail to the opening after the step of cutting tabs.

4. The method of claim 1, wherein the carrying web has an external side and wherein the method further including the step of punching embosses on the external side of the carrying web.

5. The method of claim 1, wherein the progressive die stamping technology includes a plurality of stations each with a die for performing needed operations at the station.

6. The method of claim 5, wherein each die at the plurality of stations operates on two subsequent bushings.

7. The method of claim 1, wherein the tabs are aligned with the guides.

8. The method of claim 7, wherein the guides are selected from a group consisting of holes and notches.

9. The method of claim 2, wherein each bushing is further polished or filed to remove any portion of the tabs residual at the end of the bushing.

10. The method of claim 3, wherein each bushing is further polished or filed to remove any portion of the tabs residual at the end of the bushing.

* * * * *